US009829966B2

(12) United States Patent
Gulati et al.

(10) Patent No.: US 9,829,966 B2
(45) Date of Patent: Nov. 28, 2017

(54) METHOD FOR PREPARING A SYSTEM FOR A POWER LOSS

(71) Applicant: Apple Inc., Cupertino, CA (US)

(72) Inventors: Manu Gulati, Saratoga, CA (US); Tristan R. Hudson, San Jose, CA (US); Parin Patel, San Francisco, CA (US); Fabien Faure, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 14/486,491

(22) Filed: Sep. 15, 2014

(65) Prior Publication Data

US 2016/0077579 A1 Mar. 17, 2016

(51) Int. Cl.
*G06F 1/32* (2006.01)
*G06F 1/20* (2006.01)
*G06F 1/30* (2006.01)

(52) U.S. Cl.
CPC ............ *G06F 1/3296* (2013.01); *G06F 1/206* (2013.01); *G06F 1/30* (2013.01); *G06F 1/3275* (2013.01); *Y02B 60/1228* (2013.01); *Y02B 60/1275* (2013.01); *Y02B 60/1285* (2013.01)

(58) Field of Classification Search
CPC ... G11C 11/404; G11C 11/406; G06F 1/3203; G06F 1/3296
USPC .......................................................... 713/323
See application file for complete search history.

(56) References Cited

U.S. PATENT DOCUMENTS

| 5,557,777 | A | 9/1996 | Culbert |
| 6,088,762 | A * | 7/2000 | Creta ................... G11C 11/404 365/222 |
| 7,478,252 | B2 | 1/2009 | Yoon |
| 7,814,485 | B2 | 10/2010 | Morgan et al. |
| 2004/0057576 | A1* | 3/2004 | Lavaud ................ H04M 19/08 379/413 |
| 2004/0130539 | A1* | 7/2004 | Yabu ........................ G09G 3/22 345/204 |
| 2006/0049244 | A1* | 3/2006 | Hayakawa ........... G06K 7/0008 235/382 |
| 2006/0136758 | A1* | 6/2006 | Yoon ...................... G11O 5/147 713/300 |
| 2007/0150760 | A1* | 6/2007 | Nowlin ................. G06F 1/3203 713/300 |
| 2007/0285572 | A1* | 12/2007 | Jung ..................... G06F 3/1423 348/569 |

(Continued)

*Primary Examiner* — Thomas Lee
*Assistant Examiner* — Santosh R Poudel
(74) *Attorney, Agent, or Firm* — Meyertons, Hood, Kivlin, Kowert & Goetzel, P.C.

(57) ABSTRACT

In an embodiment, a system includes a power management unit (PMU), a non-volatile memory, a volatile memory, and a processor. The PMU may be configured to generate a power supply voltage, change a state of a status signal responsive to an event, and reduce a voltage level of the power supply voltage responsive to a predetermined period of time elapsing from detecting the event. The system may be configured to transition from a first to a second operating mode responsive to the change of the state of the status signal, and cancel pending commands to the non-volatile memory responsive to the transition to the second operating mode. The non-volatile memory may be configured to complete active commands prior the predetermined period of time elapsing.

20 Claims, 5 Drawing Sheets

(56) References Cited

U.S. PATENT DOCUMENTS

| | | | |
|---|---|---|---|
| 2008/0307132 A1* | 12/2008 | Zaks | G06F 13/385 |
| | | | 710/106 |
| 2009/0102618 A1* | 4/2009 | Iwai | H02J 9/062 |
| | | | 340/538 |
| 2010/0208504 A1* | 8/2010 | Kim | G11C 11/14 |
| | | | 365/80 |
| 2012/0151241 A1* | 6/2012 | Kursula | G06F 1/3275 |
| | | | 713/340 |
| 2013/0073897 A1 | 3/2013 | Khmelnitsky | |
| 2013/0103935 A1* | 4/2013 | Maddigan | G06F 1/3206 |
| | | | 713/2 |
| 2013/0148457 A1 | 6/2013 | Sweere et al. | |
| 2014/0108830 A1 | 4/2014 | Morgan et al. | |
| 2015/0115622 A1* | 4/2015 | Burdenko | E05B 47/0001 |
| | | | 292/138 |
| 2015/0167374 A1* | 6/2015 | Symanow | B60K 6/48 |
| | | | 49/31 |

* cited by examiner

METHOD FOR PREPARING A SYSTEM FOR A POWER LOSS

BACKGROUND

Technical Field

Embodiments described herein are related to the field of systems on a chip (SoCs) and, more particularly, to configuration fuses in an SoC.

Description of the Related Art

A variety of electronic devices are now in daily use with consumers. Particularly, computing devices have become ubiquitous. As used herein, a computing device or computing system may refer to any electronic device that includes a processor, memory, a user interface and a display. Examples of personal computing devices may include desktop computers, personal digital assistants (PDAs), smart phones that combine phone functionality and other computing functionality, tablets, laptops, net tops, smart watches, wearable electronics, etc.

While a computing device is operating in an active mode, functional blocks in the device may be in various states of activity. For example, a non-volatile memory may be reading or storing data, a display may be showing various images, and a communications module may be sending and/or receiving data. In some computing devices, various events may occur requiring the device to unexpectedly transition to a reset state or a power-down state, i.e., the processor and/or operating system running on the processor are not aware of the event until it occurs. For example, a power source, such as a battery in a tablet, may be reaching a level of power output that is too low for the device to remain fully functional. Another example may include an operating system that can become unresponsive, requiring a user to input a reset or power-down command. If an unexpected reset event or power-down event occurs, active functional blocks may be interrupted which may cause errors or reliability issues.

SUMMARY

In an embodiment, a system, such as a computing system, includes a power management unit (PMU), a non-volatile memory, a volatile memory, and a processor. The PMU may be configured to generate a first power supply voltage. The PMU may be further configured to change a state of a status signal in response to an event, and then reduce a voltage level of the first power supply voltage in response to a predetermined period of time elapsing from detecting the event. The system may be configured to transition from a first operating mode to a second operating mode in response to the change of the state of the status signal, and cancel pending commands to the non-volatile memory in response to the transition to the second operating mode. The non-volatile memory may be configured to complete active commands prior to the predetermined period of time elapsing. The processor may be further configured to send a refresh command to the volatile memory in response to the non-volatile memory completing the active commands.

In a further embodiment, the processor may be further configured to transition to an inactive off state in response to the reduction of the voltage level of the first power supply voltage. The power management unit may be further configured to reduce a voltage level of a second power supply signal in response to the processor entering the inactive off state. In another embodiment, the processor may be further configured to transition to a reset state in response to the reduction of the voltage level of the first power supply voltage.

In one embodiment, to change the state of the status signal in response to the event, the power management unit may be further configured to change the state of the status signal in response to an assertion of a reset signal. In another embodiment, to change the state of the status signal in response to the event, the power management unit may be further configured to change the state of the status signal in response to a determination that a voltage level of a power supply input is less than a predetermined threshold level.

In a further embodiment, to change the state of the status signal in response to the event, the power management unit may be further configured to change the state of the status signal in response to a determination that an operating temperature is greater than a predetermined threshold temperature. In one embodiment, the processor may be further configured to send a power down command to a display in response to the change of the state of the status signal.

BRIEF DESCRIPTION OF THE DRAWINGS

The following detailed description makes reference to the accompanying drawings, which are now briefly described.

Figure 1:
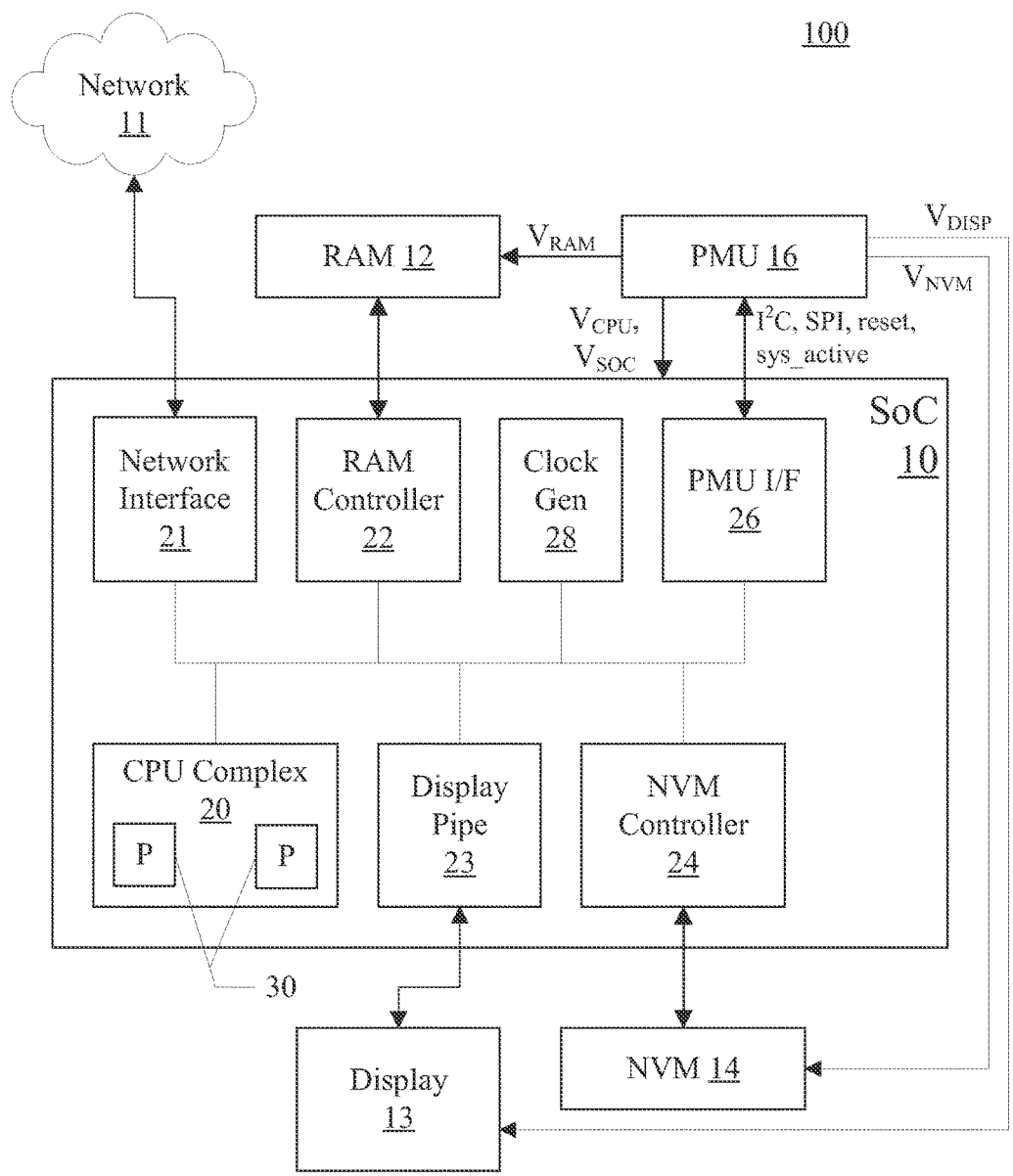
FIG. 1 is a block diagram of one embodiment of an system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an HI embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

In an active system, any number of circuits in the system may be in various states of activity. An occurrence of an unexpected reset event or power-down event (herein referred to as a "shut-down" event) may create a need to interrupt active circuits, which, if mishandled, may cause errors or reliability issues. For example, if a non-volatile memory (NVM) is in the process of executing a program command and a power supply signal or a clock signal to the NVM is switched off, then memory cells in the process of being programmed may be left in a partially programmed state in which the stored values may be unknown. Reading these values upon a return of the system to an active mode may result in unknown values being read and depending on the intended use for the data, might lead to unintended operation of the system or even a failure in the operating system, i.e., a system "crash." In some embodiments, the NVM may be stressed by such an interruption to a point that memory cells in the non-volatile are physically damaged, leading to possible reliability issues. These undesired effects may be reduced or avoided by providing a controlled process for shutting down active circuits upon an occurrence of an unexpected shut-down event which may allow circuits to prepare for the event.

Other circuits in the system may also suffer undesirable effects from a shut-down event if not allowed to prepare. For example, a volatile memory, such as a dynamic random access memory (DRAM), may lose some data contents if a voltage level of a power supply or a frequency of a clock signal drops below a minimum operating level. In some embodiments, if a voltage level of a power supply drops below a minimum operating level, a display may continue to show a faint version of the last image displayed, sometimes referred to as a "ghost image" or "ghosting effect." In other embodiments, a drop in a frequency of a clock signal or voltage level of a power supply may cause an interruption to communication on a network interface such that an incomplete data packet is transmitted or received. These are all additional examples in which a controlled process for shutting down active circuits may reduce or avoid unwanted effects in response to a shut-down event.

System Overview

Turning now to FIG. 1, a block diagram of one embodiment of system 100 is illustrated. System 100 may include SoC 10 coupled to network 11, random access memory (RAM) 12, display 13, non-volatile memory (NVM) 14, and power management unit (PMU) 16. Components of SoC 10 may be integrated onto a single semiconductor substrate as an integrated circuit "chip." In other embodiments, the components may be implemented on two or more discrete chips in a sub-system of system 100. In the illustrated embodiment, the components of SoC 10 include central processing unit (CPU) complex 20, network interface 21, RAM controller 22, display pipe 23, NVM controller 24, power management unit interface (PMU I/F) 26, and clock generation unit (clock gen) 28. Network interface 21 may be coupled to network 11 via a wired or wireless link. Display pipe 23 may be coupled to one or more displays. RAM controller 22 may be coupled to RAM 12 during use and NVM controller 24 may be coupled to NVM 14 during use. PMU I/F 26 may be coupled to PMU 16. PMU 16 may be configured to supply various power supply voltage to SoC 10, RAM 12, and/or NVM 14. In the illustrated embodiment, CPU complex 20 may include one or more processors (P 30 in FIG. 1). The processors 30 may form the CPU(s) of SoC 10.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or SoC 10 as a whole may be referred to as powered up/down, etc. A component may be one or more predefined circuit blocks which provides a specified function within SoC 10 and which has a specific interface to the rest of SoC 10. Thus CPU complex 20, network interface 21, display pipe 23, RAM controller 22, and PMU I/F 26 may each be examples of a component.

System 100 may include multiple independent power domains. A power domain may refer to a component, a group of components, and/or subcomponents coupled to a common power supply signal. Generally, a power domain may be configured to receive a power supply signal (i.e. be powered on) or not receive power supply signal (i.e. be powered off) independent of other power domains. In some embodiments, power domains may be supplied with different supply voltage magnitudes concurrently. This independence may be implemented in a variety of fashions. For example, the independence may be implemented by providing separate power supply signal inputs from PMU 16, by providing power switches between the supply voltage inputs and components and controlling the power switches for a given domain as a unit, and/or a combination of the above. Components may be in one or more independent power domains in various embodiments. For example, CPU complex 20 may have an independent power domain (and each CPU processor 30 may have an independent power domain as well) in one embodiment.

Some components may be active if they are powered up and not clock gated (i.e., it is receiving a clock signal) while other components may just require power. For example, a processor in CPU complex 20 may be available for instruction execution if it is active. Some components may be inactive if they are powered off or in another low power state in which a significant delay may be experienced before instructions may be executed. For example, if the component requires a reset or a relock of a phase lock loop (PLL), it may be inactive even if it remains powered. A component may also be inactive if it is clock gated. Clock gating may refer to techniques in which the clock to circuitry in the component is temporarily "turned off."

As mentioned above, CPU complex 20 may include one or more processors 30 that may serve as the CPU of SoC 10.

The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. CPU complex 20 may further include other hardware such as an L2 cache and/or an interface to the other components of the system such as RAM controller 22, for example.

Generally, a processor may include any circuitry and/or microcode configured to execute instructions defined in an instruction set architecture implemented by the processor. Processors may encompass processor cores implemented on an integrated circuit with other components as a system on a chip (SoC 10) or other levels of integration. Processors may further encompass discrete microprocessors, processor cores and/or microprocessors integrated into multichip module implementations, processors implemented as multiple integrated circuits, etc.

To facilitate communication with various other devices, network interface 21 may include one or more networking links, such as wireless protocols Bluetooth™ and Wi-Fi™, or wired protocols such as Ethernet and Universal Serial Bus (USB). Network 11 may include links to communicate with other devices or data servers at either a local or global level. In some embodiments, network 11 may also include a cellular phone network.

RAM controller 22 may generally include the circuitry for receiving memory operations from the other components of SoC 10 and for accessing RAM 12 to complete the memory operations. RAM controller 22 may be configured to access any suitable type of RAM 12. For example, RAM 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The RAM controller 22 may include queues for memory operations, for ordering (and potentially reordering) the operations and presenting the operations to RAM 12. The RAM controller 22 may further include data buffers to store write data awaiting write to memory and read data awaiting return to the source of the memory operation. In some embodiments, RAM controller 22 may include a memory cache to store recently accessed memory data. In SoC implementations, for example, the memory cache may reduce power consumption in the SoC by avoiding repetitive access of data from RAM 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within RAM controller 22.

When SoC 10 is powered down, part of the power down sequence may be to place RAM 12 in a retention mode. For example, for DRAM embodiments of RAM 12, the retention mode may be a "self-refresh" mode. In retention mode, RAM 12 may not be externally accessible until the mode is changed. The contents, however, of RAM 12 may be preserved. For example, in the self-refresh mode, the DRAM may perform the periodic refreshes needed to retain data (which are normally performed by RAM controller 22, when RAM controller 22 is powered on).

Display pipe 23 may provide an interface to display 13, sending image frames (i.e., a packet of data representing one image to fill a display screen) to display 13. In some embodiments, display pipe 23 may include additional circuit blocks for processing image data frames while in other embodiments a separate graphics processor may be included for image processing. Display 13 may include one or more display screens of any suitable technology or combination thereof, such as, for example, a back-lit liquid crystal diode (LCD), an organic light emitting diode (OLED), or plasma. Display 13 may be in a same enclosure as system 100, such as may be used in a phone or tablet, or may be in a separate housing coupled to system 100 through cables or a wireless connection such as may be used with a desktop computer.

In some embodiments, display 13 may experience a "ghosting" effect if a voltage level of a power supply signal is reduced below a minimum operating level while display 13 is showing an image. "Ghosting," herein, refers to when a faint outline of a displayed image persist after the display is powered down. This ghosting effect may be reduced or avoided by displaying an all-dark, e.g., solid black, image before the voltage level of the power supply signal is reduced below the minimum operating level.

NVM controller 24 may provide an interface to NVM 14. NVM controller 24 may include data buffers for reading and writing data from/to NVM 14. In various embodiments, NVM controller 24 may interface with unmanaged or managed non-volatile memory. NVM 14 may, therefore, include managed or unmanaged memory such as flash, ferroelectric RAM (FRAM or FeRAM), Resistive RAM (RRAM or ReRAM), magnetoresistive RAM (MRAM), or optical disk storage such as DVD-RW or CD-RW. A managed component of NVM 14 may include a memory controller that handles read/write operations as well as higher level tasks such as address mapping, wear leveling, and garbage collection. Unmanaged components of NVM 14 may include only basic read/write functions, leaving the higher level tasks to a component in system 100, such as NVM controller 24 or a processor 30 in CPU complex 20.

Non-volatile memory, such as flash, may require some time for programming operations to write or erase memory cells. Times required for programming operations may be long enough that if a voltage level of a power supply signal to NVM 14 is reduced below a minimum operating level while a programming operation is active, the programming operation may not be able to complete, leaving the memory cells undergoing the programming operation in an indeterminate state. Upon the voltage level rising back above the minimum operating level, read values within the impacted memory cells may not be trusted. NVM controller 24 may be able to reduce or avoid programming interruptions by cancelling pending programming commands and providing enough time to complete active programming commands before the voltage level of the power supply signal falls below the minimum operating level.

PMU I/F 26 may be configured to control the supply voltage magnitudes requested from PMU 16. There may be multiple supply voltages generated by PMU 16 for SoC 10. For example, illustrated in FIG. 1 are a $V_{CPU}$ and a $V_{SOC}$. The $V_{CPU}$ may be the supply voltage for CPU complex 20. The $V_{SOC}$ may generally be the supply voltage for the rest of SoC 10 outside of CPU complex 20. There may be, however, separate supply voltages for a memory controller power domain, such as, for example, RAM Controller 22, in addition to the $V_{SOC}$ for the other components. In another embodiment, $V_{SOC}$ may serve RAM controller 22 as well as the other components of SoC 10 and power gating may be employed based on the power domains. There may be multiple supply voltages for the rest of SoC 10, in some embodiments. In some embodiments, there may also be a memory supply voltage for various memory arrays in CPU complex 20 and/or SoC 10. The memory supply voltage may be used with the voltage supplied to the logic circuitry (e.g. $V_{CPU}$ or $V_{SOC}$), which may have a lower voltage magnitude than that required to ensure robust memory operation. PMU I/F 26 may be under direct software control (e.g. software may directly request the power up and/or power down of components) and/or may be configured to monitor SoC 10 and determine when various components are to be powered up or powered down.

PMU 16 may generally include the circuitry to generate supply voltages and to provide those supply voltages to other components of the system such as SoC 10 ($V_{SOC}$ and $V_{CPU}$ in FIG. 1), RAM 12 ($V_{RAM}$), display 13 ($V_{DISP}$), NVM 14 ($V_{NVM}$) and various other components (not shown in FIG. 1) such as image sensors, user interface devices, etc. PMU 16 may thus include programmable voltage regulators, as well as logic to interface to SoC 10 and more particularly PMU I/F 26 to receive voltage requests, etc. As part of the logic to interface to SoC 10, PMU 16 may include a serial interface for general communication, such as an inter-integrated circuit bus (I²C) or serial peripheral interface (SPI) and, in addition, one or more status signals such as sys_active and RESET to indicate to SoC 10 a current state of operation. The sys_active signal, when asserted, may indicate to SoC 10 that PMU 16 is active and fully functional. Sys_active may be de-asserted when PMU 16 detects a fault condition that may require PMU 16 to reduce the voltage level of the output power supply signals or turn one or more of the output power supply signals off. In some embodiments, sys_active may de-assert before RESET is asserted. Examples of fault conditions may include a voltage level of a power supply input to PMU 16 falling near or below a minimum safe operating level or a temperature measurement rising close to or over a maximum safe operating temperature.

It is noted that asserting a signal may refer to the signal transitioning to a predetermined value in response to a corresponding condition occurring and an asserted signal may refer to the signal remaining at the predetermined value. De-asserting a value may refer to the signal transitioning to a different or opposite value from the predetermined value in response to the corresponding condition ending or in response to circuitry associated with the assertion of the signal being acknowledged by another circuit such as a CPU processor 30. In some embodiments, the predetermined assertion value may correspond to a logic high while in other embodiments, the predetermined assertion value may correspond to a logic low.

Clock gen 28 may include one or more clock sources used by components of SoC 10. Types of clock sources included in clock gen 28 may include, for example, any combination of a phase-locked loop (PLL), a frequency-locked loop (FLL), a delay-locked loop (DLL), a crystal oscillator, and an internal oscillator. In addition, clock gen 28 may include frequency multipliers and/or dividers. In some embodiments, one or more clock sources in clock gen 28 may remain active in reduced power modes to provide a system clock signal to components that remain active in a reduced power mode.

It is noted that the number of components of SoC 10 (and the number of subcomponents for those shown in FIG. 1, such as within CPU complex 20) may vary from embodiment to embodiment. There may be more or fewer of each component/subcomponent than the number shown in FIG. 1.

Figure 2:
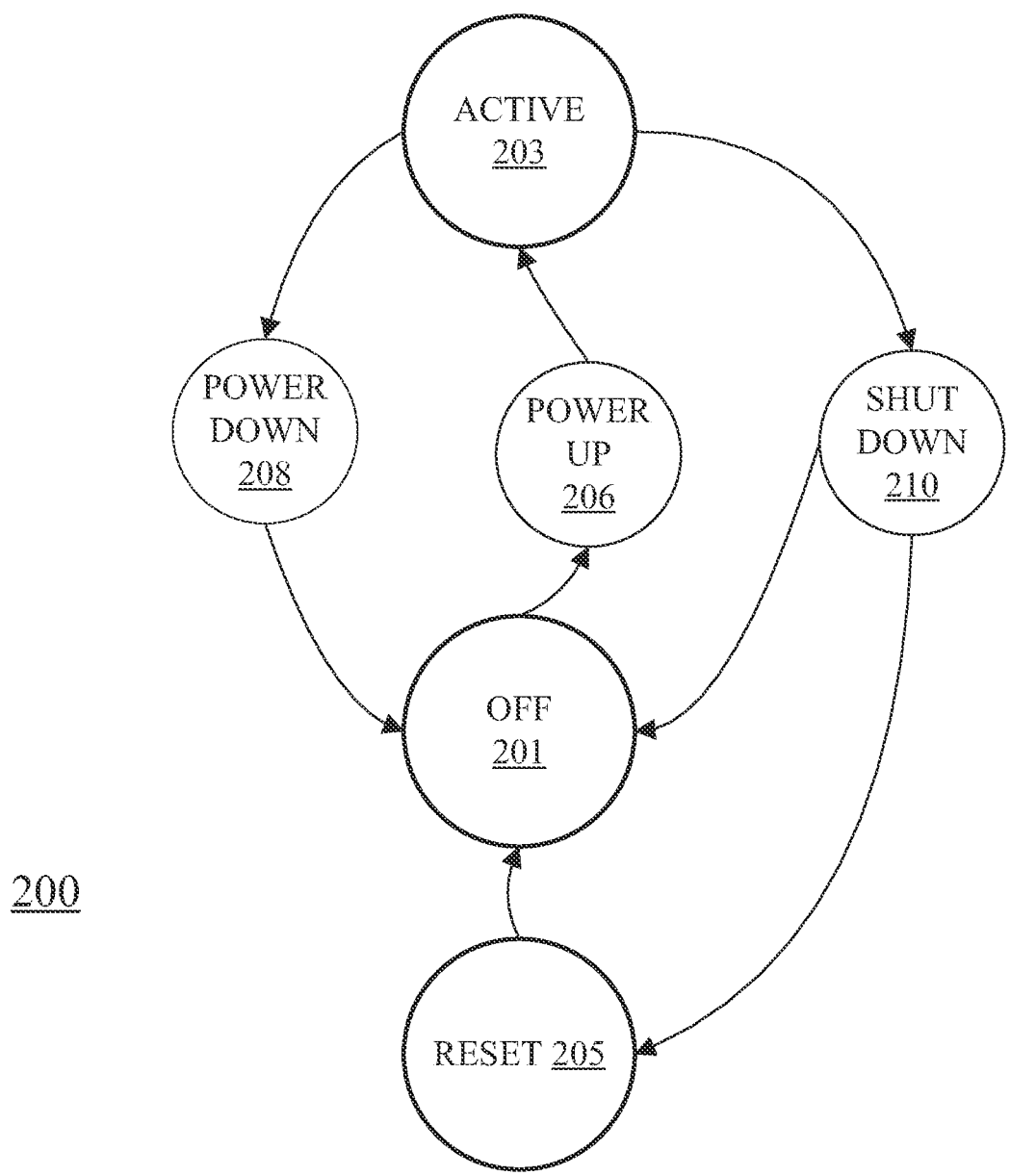
FIG. 2 is a state diagram of one embodiment of a state machine for a system.

Turning now to FIG. 2, a block diagram of a state machine is shown. State machine 200 of FIG. 2 may be applied to a system such as, for example, system 100 in FIG. 1. In the illustrated embodiment, state machine 200 may include primary states such as off state 201, active state 203, and reset state 205. State machine 200 may also include transitory states such as power up state 206, power down state 208, and shut down state 210. The transitory states may be entered upon a transition between certain primary states, such as between active state 203 and off state 201. In some embodiments, there may be multiple paths between two primary states, in which case, a path may be selected depending on the conditions causing the state transition.

Off state 201 may be a primary state which system 100 enters when a computing device is turned off. Although system 100 may be in off state 201, a subset of circuits within system 100 may continue to operate. For example, circuits for time keeping or to monitor a user interface may be kept in an at least partially active state to perform those tasks. In some embodiments, a volatile memory, such as RAM 12, or a portion thereof, may be placed into a data retention mode such as a self-refresh mode of a DRAM, while in other embodiments, RAM 12 may be powered down. In various embodiments, some registers and/or some local RAMs within SoC 10 may also be placed in a data retention state such that some or all circuit blocks in SoC 10 may be able to recover to active state 203 faster by retaining current configuration values and therefore not requiring re-initialization upon re-entering active state 203. Off state 201 may also be entered in response to certain pre-determined conditions, such as, for example, if a voltage level of a power supply drops below a predetermined level, system 100 may transition to off state 201 to reduce power consumption. Another example may be if an operating temperature of system 100 reaches a predetermined threshold temperature, system 100 may transition to off state 201 to reduce the operating temperature by reducing system activity. In some embodiments, system 100 may enter another state, such as, for example, reset state 205, before entering off state 201. Off state 201 may be exited by transitioning to active state 203 through transitional power up state 206.

Active state 203 may be another primary state in which system 100 is capable of being fully functional. Although system 100 may be in active state 203, some circuit blocks may be kept in a reduced power state if not currently in use. For example, network interface 21 may be placed into a reduced power mode in which it waits to receive data from network 11 if network interface 21 is not currently sending data. Similarly, NVM controller 24 may be placed into a reduced power mode if NVM 14 is not currently being accessed. Memories, such as RAM 12 may be fully operational for read and write access. Display 13 may be active and displaying images. PMU 16 may be supplying any required power supply signals for system 100 to operate. Active state 203 may transition to off state 201 through transitory state power down 208 or through shut down state 210. Active state 203 may also transition to reset state 205 through shut down state 210.

Reset state 205 may be a primary state in which system 100 is fully reset. As stated above, some registers and memories associated with certain circuits may retain data in off state 201 to facilitate a faster transition to active state 203. Under some conditions, it may be desired to have most or all circuits return to a default power up state in which no previous settings or data are retained in the registers and volatile memories. Reset state 205 may force some or all circuits in system 100 to be reset to default power on values, i.e., values used when system 100 powers up initially. Resetting system 100 may be required to avoid repeating a condition which caused erroneous or undesired operation. For example, if clock gen 28 is erroneously configured to generate a clock signal with a frequency higher than system 100 can reliably operate, then active state 203 may be transitioned into reset state 205 responsive to a system error, which may result in clock gen 28 being reset to default settings with an output frequency adequate for safe operation. Reset state 205 may transition to off state 201 and may not require a transitory state for the transition.

Power up state 206 may be a transitory state between off state 201 and active state 203. A transitory state, as used herein, may be a temporary state between primary states in which system 100 remains just until conditions are met to enter the target primary state. In power up state 206, a status value may be used to determine if circuits in system 100 have been previously initialized or if system 100 has been reset by having previously been in reset state 205 since the last time power up state 206 was entered. Depending on the status value, configuration circuits in system 100 may fully initialize system 100 if reset state 205 has been entered or perform a partial initialization if reset state 205 has not been entered since the previous initialization. PMU 16 and clock gen 28 may be initialized to output power supply and clock signals respectively. Active state 203 may be entered upon determining one or more power supply signals from PMU 16 and one or more clock signals from clock gen 28 have reached an adequate operating range for system 100.

Power down state 208 may be entered when system 100 is transitioning from active state 203 to off state 201 responsive to a power down request from SoC 10. Transitioning through power down state 208 may indicate that SoC 10 has requested or is relaying a request from another part of system 100 to enter off state 201. SoC may request a transition to off state 201 upon determining that system 100 has been idle for an extended, predetermined amount of time or upon receiving a command from a user through an operating system running on system 100 to power down. Circuits within system 100 may be prepared for the transition to off state 201 while still in active state 203 or in other embodiments, in power down state 208. In power down state 208, clock gen 28 and PMU 16 may be instructed to reduce or switch off one or more clock or power supply signals, respectively, upon determining that the circuits of system 100 are prepared for entering off state 201. Off state 201 may be entered upon clock gen 28 and PMU 16 reaching adequate levels of stability.

Shut down state 210 is a transitory state that may be entered if system 100 is to transition to off state 201 or reset state 205 without a request from SoC 10. Circuits within system 100 may detect one or more conditions that may not be suitable for reliable operation of system 100. For example, in a battery-powered mobile device, if a voltage level of the battery's output falls to or below a minimum safe operating level, then a voltage detection sub-circuit in PMU 16 may assert an internal low voltage signal which may cause PMU 16 to prepare to shut down or reduce a voltage level of one or more power supply signals to SoC 10 and other components of system 100, such as RAM 12, display 13, or NVM 14. PMU 16 may also assert a warning signal to alert SoC 10 that voltage levels of one or more power supply signals will be reduced. In some embodiments, PMU 16 may wait a predetermined amount of time before reducing any power supply signals. SoC 10 may use the predetermined amount of time to prepare at least some circuits in system 100 for the reduction of voltage levels of corresponding power supply signals. For example, NVM controller 24 may cancel any pending operations in NVM 14 that have not yet begun and determine if any operations are active that cannot be interrupted. In some embodiments, RAM controller 22 may prepare RAM 12 for the transition by enabling a self-refresh mode in RAM 12, while in other embodiments, RAM controller 22 may prepare RAM 12 to be powered down. The self-refresh mode may allow RAM controller 22 to disable a clock signal supplied from SoC 10 to RAM 12 by enabling circuits within RAM 12 provide a clock signal internally for refreshing data values stored in RAM 12. While RAM 12 is in the self-refresh mode, memory locations in RAM 12 may not be accessible for reading or writing. RAM controller 22 may, in some embodiments, wait for the predetermined amount of time before enabling the self-refresh mode or powering RAM 12 down. Waiting for the predetermined amount of time may allow NVM controller 24 to access data in RAM 12 to complete any active operations in NVM 14. In other embodiments, RAM controller 22 may wait for a signal from NVM controller 24 that operations in NVM 14 are complete and the self-refresh mode may be enabled or the power down may occur. Display pipe 23 may, in some embodiments, prepare display 13 for the transition by "blanking" the display, or, in other words, sending an image data frame to display 13 to display a solid black, or other suitable color, image.

Once the predetermined amount of time has elapsed, PMU 16 may reduce the voltage level on one or more of the power supply signals. System 100 may transition to either off state 201 or reset state 205 depending on other conditions that may determine if system 100 requires a full reset or not.

It is noted that the state machine of FIG. 2 is merely an embodiment for demonstrative purposes. Other embodiments may have a different number of states and may include different transitions between states.

Figure 3:
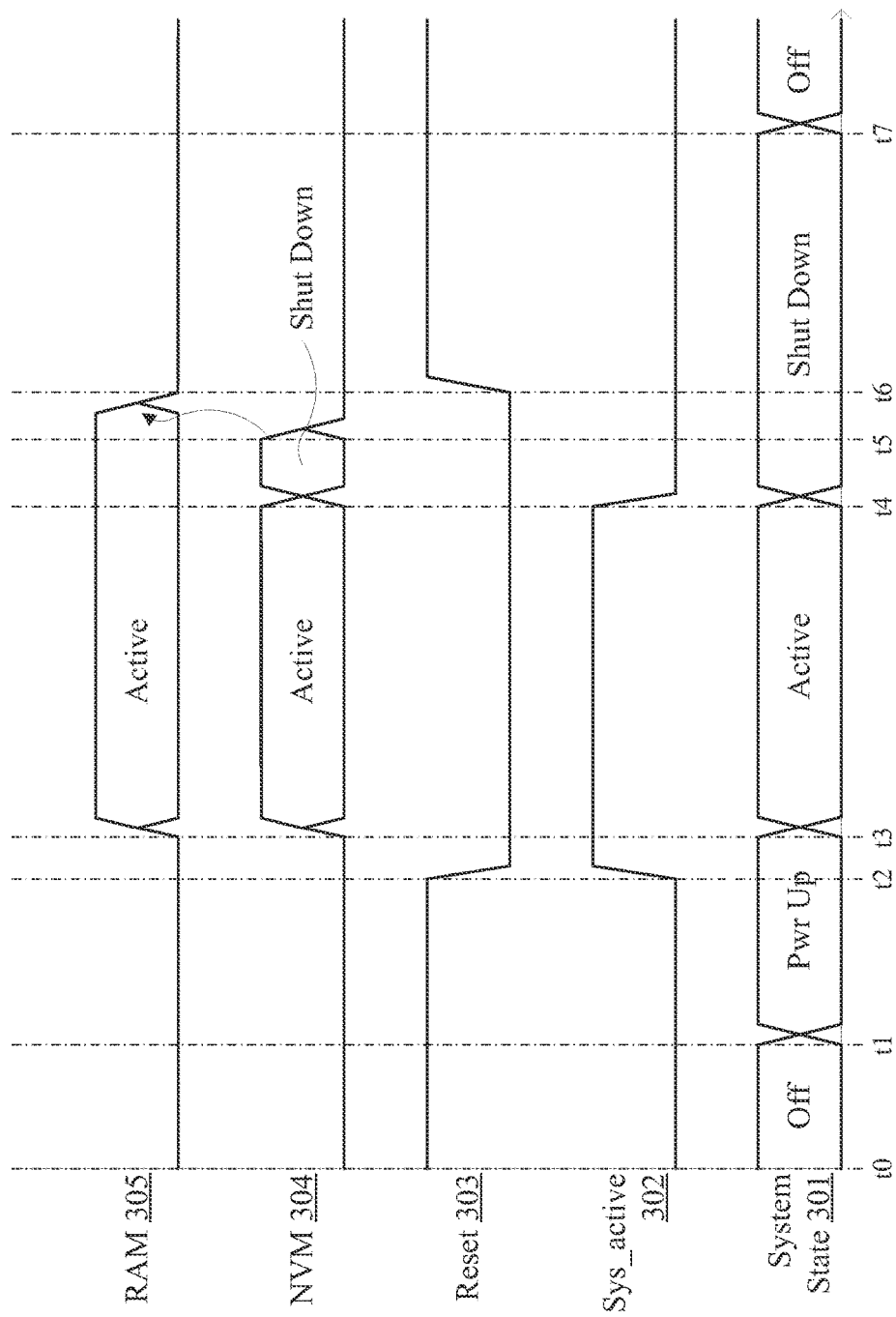
FIG. 3 is a graph of waveforms associated with an embodiment of a system transitioning through operating states.

Turning to FIG. 3, a timing diagram is presented that illustrates timing of signals in a system, such as system 100 in FIG. 1, transitioning through operational states. The timing diagram of FIG. 3 shows signals for system state 301, sys_active 302, reset 303, NVM 304, and RAM 305. System state 301 may apply to states of a state machine such as, for example, state machine 200 in FIG. 2. Sys_active 302 may correspond to the sys_active signal shown in FIG. 1 and described above in relation to PMU 16. In various embodiments, reset may correspond to a reset signal generated by PMU 16 or within SoC 10. In some embodiments, reset 303 may be asserted to other components in system 100 in addition to SoC 10. NVM 304 and RAM 305 may illustrate states of memory components in system 100, such as NVM 14 and RAM 12, respectively.

The timing diagram begins at time t0, at which point system 100 may be in off state 201. Some power supply signals from PMU 16 may be disabled or at a reduced voltage level in response to being in off state 201. Additionally, sys_active 302, output from PMU 16, may be de-asserted. Reset 303 may be asserted to prevent SoC 10 or other components from operating while in off state 201. NVM 304 and RAM 305 may be their respective off states.

At time t1, system 100 may begin a transition to active state 203. To initiate the transition to active state 203, a signal may be asserted through a user interface to system 100, or a component within system 100 may assert a signal in response to a stimulus, such as, for example, a sensor value may cross a threshold or an active timer may reach a predetermined value. In response to the asserted signal, system 100 may transition into power up state 206. During power up state 206, PMU 16 may switch on, or increase a voltage level of power supply signals that were off or lowered in off state 201. In some embodiments, PMU I/F 26 may instruct PMU 16 which power supply signals to enable. In other embodiments, PMU 16 may return to a previous configuration or may be reset to a default configuration without instructions from PMU I/F 26. Clock gen 28 may likewise return to a previous or default configuration once a power supply signal from PMU 16, such as $V_{SOC}$, for example, has reached an adequate operating voltage level.

NVM 304 and RAM 305 may remain in their respective off states until system 100 is in active state 203 and power supply and clock signals from PMU 16 and clock gen 28 are adequately stable. In other embodiments, RAM 305 and/or NVM 304 may transition into their active states during the power up state 206 such that once SoC 10 is in active state 203, the memories are ready to be accessed.

At time t2, the power supply signals may have reached adequate levels of stability and PMU 16 may, in response, assert sys_active 302 to indicate to SoC 10 that it is safe to enter active mode 203. Reset 303 may be de-asserted at this time or in other embodiments, may be de-asserted in response to the assertion of sys_active 302. SoC 10 may initialize various components in response to the assertion of sys_active 302 and/or the de-assertion of reset 303. At time t3, system 100 may transition from power up state 206 to active state 203. NVM 304 and RAM 305 may be accessed as required during active state 203.

At time t4, a shut-down event may occur and PMU 16 may de-assert sys_active 302. System 100 may enter shut down state 210. PMU 16 may also initiate a timer to count for a predetermined amount of time before disabling or reducing the voltage levels of power supply signals. In response to the de-assertion of sys_active 302, NVM controller 24 may prepare NVM 14 for a transition to off state 201 by cancelling any pending operations. Operations that have begun and cannot be interrupt without risking a loss of data or stress to the NVM memory cells, may be allowed to continue with the expectation that these operations will complete within the predetermined amount of time being counted in PMU 16. RAM controller may keep RAM 12 active during this time in the event any data needs to be read from or written to RAM 12 in support of NVM 14 completing the active operations.

SoC 10 may prepare other modules for transition to off state 201 during the predetermined amount of time. For example, display pipe 23 may prepare display 13 by blanking display 13 to avoid ghost images. As another example, network interface 21 may interrupt an active data exchange to send a shut-down warning to network 11 to indicate that system 100 is entering off state 201.

NVM 14 may complete active operations by time t5. In response to the completion of the active operations, NVM controller 24 may provide an indication to RAM controller 22 that NVM 14 is done with operations. In other embodiments, RAM controller 22 may simply wait a second predetermined amount of time (shorter than the amount of time being counted in PMU 16). In response to either the indication from NVM controller 24 or a determination the second amount of time has elapsed, RAM controller 22 may enable a reduced power mode, such as a self-refresh mode in a DRAM, for RAM 12. In other embodiments, RAM 12 may be powered down rather than placed into a self-refresh mode.

The predetermined amount of time being counted in PMU 16 may elapse at time t6. In response to the predetermined amount of time elapsing, PMU 16 may disable or reduce a voltage level of one or more power supply signals. Reset 303 may also be asserted at this time. In some embodiments, PMU 16 may assert reset 303 within system 100. In other embodiments, another component in system 100, such as, e.g., SoC 10 may assert reset 303 responsive to PMU 16 disabling or reducing the voltage level of one or more power supply signals. During shut down state 210, power supply and/or clock signals may be disabled to various components of system 100, such as, for example, RAM 12, NVM 14 and display 13.

At time t7, system 100 may enter off state 201. At this point, all components in system 100 may be in a form of reduced power mode or powered down. FIG. 3 shows system 100 entering off state 201. Under other conditions (determined by suitable sensors or signals in system 100 but not illustrated in FIG. 1), system 100 may enter reset state 205 instead of off state 201.

It is noted that the timing diagram of FIG. 3 is an example for demonstrating the disclosed concepts. Various other signals, not shown, may also be used during state transitions. In various other embodiments, other state transitions may occur before a shut-down event occurs.

Figure 4:
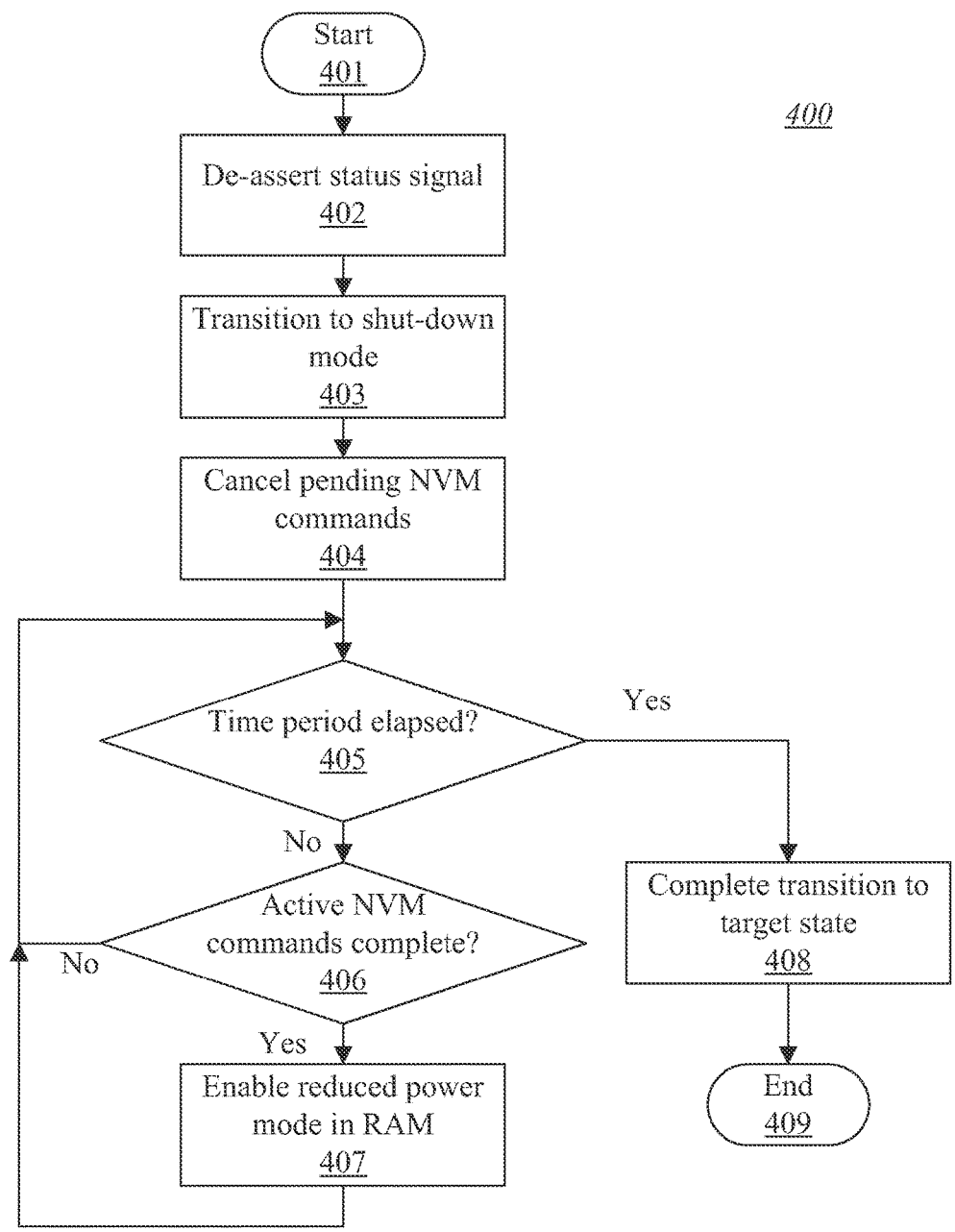
FIG. 4 is a flowchart illustrating an embodiment of a method for preparing circuits as part of an unexpected mode transition.

Turning next to FIG. 4, a flowchart is presented to illustrate a method for initializing circuits as part of a mode transition. Method 400 may be used in conjunction with a system, such as, for example, system 100 as illustrated in FIG. 1, to move between operational states such as presented in FIG. 2. Referring collectively to system 100 in FIG. 1, FIG. 2, and FIG. 4, the method may begin in block 401.

PMU 16 may de-assert the sys_active status signal to SoC 10 (block 402), changing the logic value of the signal. PMU 16 may de-assert sys_active in response to one or more sensed conditions, such as a drop in a voltage level of an output of a battery supplying power to PMU 16. Another condition may include a measurement of an operating temperature of system 100 being above a predetermined threshold. The sensed condition may be an indication that an operating parameter is moving outside of a safe operating range for system 100, and in response, system 100 may begin a transition to a safe state, such as off state 201 or reset state 205. The selection of which state to enter may be determined by which operating parameter or parameters are out of the safe operating range, and the selected state may be referred to as the target state.

In addition to de-asserting sys_active, PMU 16 may also begin measuring an elapsed time. In some embodiments, a timer circuit may be used to measure the elapsed time. In various embodiments, the timer circuit may count up from zero to a predetermined value or count down from the predetermined value to zero. In some embodiments, the predetermined value may be programmable, for example, by SoC 10 through PMU I/F 26.

In response to the de-assertion of sys_active, SoC 10 may change state to shut-down state 210 (block 403). In shut-down state 210, SoC 10 may prepare one or more components in system 100 for entering the target state. In some embodiments, only SoC 10 may receive the sys_active signal, while in other embodiments, other components may also receive the sys_active signal and independently prepare for entering the target state.

NVM controller 24 in SoC 10 may cancel any pending operations in NVM 14 (block 404). Pending operations may be queued in NVM controller 24 and/or in a command buffer in NVM 14. Pending operations may include programming and erase commands, which if interrupted before completing could cause memory cells being programmed or erased to be left with an indeterminate value. In some embodiments, interrupting a program or erase command may stress memory cells, potentially leading to long-term reliability issues. Operations that have already started may be allowed to continue with an expectation that they will be complete before entering the target state. To support active NVM operations, RAM controller 22 may keep RAM 12 active in case the active NVM operations need to read data from or store data to RAM 12.

The method may depend on a determination if a predefined time period has elapsed since the de-assertion of sys_active (block 405). In block 402, PMU 16 began measuring an elapsed time starting from the de-assertion of sys_active. If a predetermined amount of time has elapsed, then the method may move to block 408 to complete the transition to the target state. Otherwise, the method may move to block 406.

The method may now depend on the completion of the active NVM operations (block 406). Since RAM 12 may be kept active to support active operations in NVM 14, completion of these active operations may be monitored in some embodiments. If any operations are still active, then the method may move back to block 405. Otherwise, the method may move to block 407. In some embodiments, NVM 14 may not be monitored. In such an embodiment, NVM 14 may have until the predetermined amount of time expires to complete any active operations and when the time expires in block 405, the transition to the target state in block 408 may occur.

If the active operations in NVM 14 have completed, then RAM controller 22 may enable a reduced power mode in RAM 12 (block 407). In some embodiments, RAM 12 may be a DRAM and RAM controller 22 may enable a self-refresh mode to put RAM 12 into a reduced power state in preparation for the transition to the target state. In other embodiments, other forms of RAM may be used, such as SRAM, and enabling a reduced power mode may include disabling or reducing a frequency of a clock signal going to RAM 12. In different embodiments, RAM 12 may be powered down in response to the predetermined amount of time expiring, in which case, block 407 may be skipped. Once RAM 12 has entered a reduced power mode in RAM 12, the method may return to block 405 to determine if the predetermined amount of time has elapsed.

Once the predetermined amount of time has elapsed, then system 100 may complete the transition to the target state (block 408). Details of changing state to the target state will be presented in the description of the next figure. The method may end in block 409.

It is noted that, method 400 of FIG. 4 is merely an example. In other embodiments, a different number of blocks may be included or the presented blocks may be executed in a different order.

Figure 5:
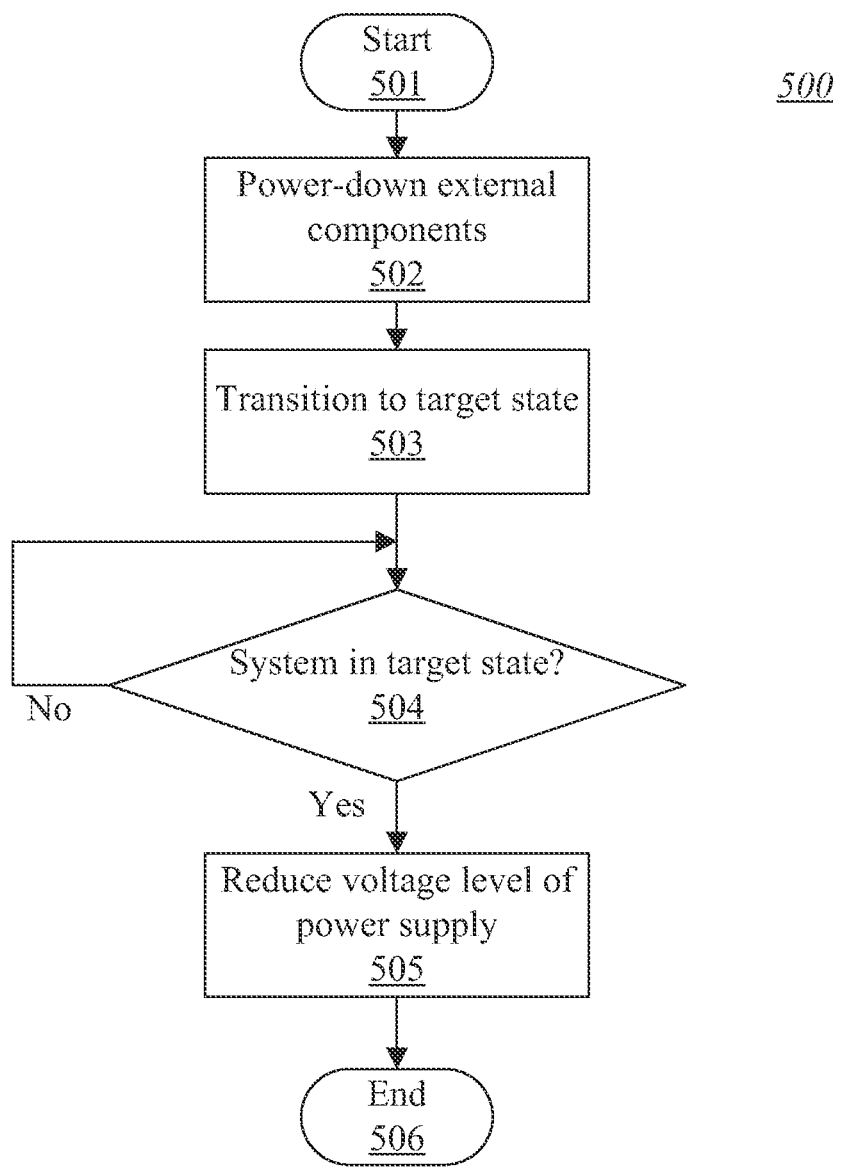
FIG. 5 illustrates a flowchart of another embodiment of a method for preparing circuits as part of an unexpected mode transition.

Turning next to FIG. 5, a flowchart is shown illustrating a method for completing a transition to a target state. Method 500 may correspond to block 408 of method 400 in FIG. 4. Method 500 may be applied to a system such as system 100 in FIG. 1 as system 100 transitions from shut-down state 210 to a target state of either off state 201 or reset state 205, as shown in FIG. 2. Referring collectively to system 100 in FIG. 1, state machine 200 of FIG. 2, and method 500 of FIG. 5, the method may begin in block 501, with the predetermined time period having elapsed since the de-assertion of sys_active.

One or more external components in system 100 may be powered down (block 502). In some embodiments, to power down a component may consist of de-asserting an enable pin of the component, via an output pin of SoC 10. In other embodiments, to power down an external component may consist of PMU 16 disabling a power supply signal to the component.

SoC 10 may place one or more internal circuits into a power down state and may enter a reduced power mode as part of the change to the target state (block 503). To enter off state 201 or reset state 205, SoC 10 may, in some embodiments, enter a reduced power mode such as a stand-by mode or sleep mode, while in other embodiments, SoC 10 may continue in the current operating mode. In some embodiments, a subset of circuits in SoC 10 may be left in a partially active state, for example, to keep time or to monitor a user interface.

The method may depend on a determination that system 100 has changed state to the target state (block 504). The method may remain in block 504 until system 100 has entered the target state. PMU 16 may wait for a status signal from SoC 10 to confirm SoC 10 is prepared to enter the target state. In other embodiments, PMU 16 may not wait for a status confirmation from SoC 10 and may skip block 504 and go straight to block 505.

PMU 16 may reduce a voltage level of one or more power supply signals (block 505). Reducing a voltage level may include disabling a power supply signal to components that do not require power in the target state. For example, SoC 10 may include circuits that remain active in the target state, so a voltage level of a power supply signal to SoC 10, such as $V_{SOC}$ in FIG. 1, may be lowered to a level that still supports this activity. In other embodiments, SoC 10 may include a separate power supply input for the circuits that remain active, in which case, PMU 16 may disable a main supply to SoC 10 and retain the separate power supply for the circuits that remain active. In contrast, display 13 may be placed in a completely off state, and PMU 16 may, therefore disable a power supply signal to display 13, such as $V_{DISP}$ in FIG. 1. Once PMU 16 has completed adjustments of power supply signals, the method may end in block 506.

It is noted that, method 500 illustrated in FIG. 5 is merely an example for demonstrating the disclosed concepts. In other embodiments, blocks may be executed in a different order or a different number of blocks may be included. For example, block 504 may be removed in some embodiments. In some embodiments, some, or all of the blocks may occur in parallel.

Numerous variations and modifications will become apparent to those skilled in the art once the above disclosure is fully appreciated. It is intended that the following claims be interpreted to embrace all such variations and modifications.

What is claimed is:
1. A system, comprising:
  a power management unit including a timer circuit, wherein the power management unit is configured to:
    generate a power supply voltage at a first voltage level corresponding to a first mode of the system in which a first set of functions are implemented;
    change a state of a status signal in response to a detection of an event;
    maintain the power supply voltage at the first voltage level;
    initiate the timer circuit in response to the detection of the event; and reduce the power supply voltage from the first voltage level to a second, non-zero voltage level in response to a determination that a count value of the timer circuit has reached a threshold value, wherein the second, non-zero voltage level corresponds to a second mode of the system in which a subset of the first set of functions is implemented;

a non-volatile memory;

a volatile memory; and a processor configured to:

transition from a first operating mode to a second operating mode in response to a determination that the state of the status signal has changed; and cancel pending commands to the non-volatile memory in response to the transition to the second operating mode;

wherein the non-volatile memory is configured to complete active commands prior to the count value of the timer circuit reaching the threshold value; and wherein the processor is further configured to send a command to instruct the volatile memory to enter a low power mode in response to a determination that the non-volatile memory has completed the active commands.

2. The system of claim 1, wherein the processor is further configured to:

access data in the volatile memory; and send the accessed data to the non-volatile memory to allow the non-volatile memory to complete the active commands.

3. The system of claim 1, wherein the processor is further configured to transition to a reset state in response to the reduction of the power supply voltage.

4. The system of claim 1, wherein the power management unit is further configured to change the state of the status signal in response to an assertion of a reset signal.

5. The system of claim 1, wherein the power management unit is further configured to change the state of the status signal in response to a determination that a voltage level of a power supply input is less than a threshold level.

6. The system of claim 1, wherein the power management unit is further configured to change the state of the status signal in response to a determination that an operating temperature is greater than a threshold temperature.

7. The system of claim 1, wherein the processor is further configured to send a power down command to a display in response to the determination the state of the status signal has changed.

8. A method for operating a computing system, the method comprising:

generating a power supply voltage at a first voltage level corresponding to a first mode of the computing system in which a first set of functions are implemented;

transitioning at least a portion of the computing system from a first operating state to a second operating state in response to a detection of an event;

maintaining the power supply voltage at the first voltage level;

initiating a timer circuit in response to the detection of the event;

changing a voltage level of a power supply from the first voltage level to a second, non-zero voltage level in response to a determination that a count value of the timer circuit has reached a threshold value, wherein the second, non-zero voltage level corresponds to a second mode of the computing system in which a subset of the first set of functions is implemented;

cancelling pending commands for a non-volatile memory in response to the transition to the second operating state;

completing active commands for the non-volatile memory prior to the count value of the timer circuit reaching the threshold value; and sending a command to instruct a volatile memory to enter a low power mode in response to determining that the active commands have completed.

9. The method of claim 8, wherein completing the active commands comprises:

accessing data in the volatile memory; and sending the accessed data to the non-volatile memory.

10. The method of claim 8, further comprising transitioning, the at least a portion of the computing system, to a reset state in response to determining that the count value of the timer circuit has reached the threshold value.

11. The method of claim 8, wherein the event corresponds to a determination that a reset signal has been asserted.

12. The method of claim 8, wherein the event corresponds to a determination that a voltage level of a power supply signal is less than a threshold level.

13. The method of claim 8, wherein the event corresponds to a determination that an operating temperature is greater than a threshold temperature.

14. The method of claim 8, further comprising sending a power down command to a display in response to detecting the event.

15. An apparatus, comprising:

a non-volatile memory controller coupled to a non-volatile memory;

a network interface coupled to one or more computing devices via a network;

a communication interface coupled to a power management unit, wherein the power management unit includes a timer circuit;

a volatile memory controller coupled to a volatile memory; and a processor core configured to:

send, via the communication interface, a command to set a value in the timer circuit, wherein the value in the timer circuit corresponds to a threshold period of time;

transition from a first operating state to a second operating state in response to a detection of a change in a state of a status signal;

interrupt an active data exchange between the network interface and at least one computing device in response to the transition from the first operating state to the second operating state; and transition from the second operating state to an inactive off state in response to a determination that the threshold period of time has elapsed since detecting the change in the state of the status signal;

wherein the non-volatile memory controller is configured to send a cancel command to the non-volatile memory in response to the detection of the change in the state of the status signal, wherein the cancel command instructs the non-volatile memory to complete an active command and cancel pending commands; and wherein the volatile memory controller is configured to send a low power command to the volatile memory in response to receiving an indication from the non-volatile memory controller that the active command in the non-volatile memory has completed.

16. The apparatus of claim 15, wherein the processor core is further configured to set the value in the timer circuit such that the threshold period of time allows the non-volatile memory sufficient time to complete the active command.

17. The apparatus of claim 15, wherein the volatile memory controller is further configured to access data in the volatile memory, and wherein the non-volatile memory controller is further configured to send the accessed data to the non-volatile memory to allow the non-volatile memory to complete the active command.

18. The apparatus of claim 15, wherein the pending commands include one or more program commands or erase commands.

19. The apparatus of claim 17, wherein the low power command activates a reduced power mode in the volatile memory.

20. The apparatus of claim 15, wherein the processor core is further configured to send a power down command to a display in response to the detection of the change in the state of the status signal.

* * * * *